PULSE COUNTER EMPLOYING TUNNEL DIODES WITH RESET MEANS

Filed Nov. 25, 1959

INVENTORS
ADOLPH K. RAPP
PHILIP SPIEGEL

BY Fordyce A. Bothwell

ATTORNEY 3,094,630
Patented June 18, 1963

3,094,630

PULSE COUNTER EMPLOYING TUNNEL DIODES WITH RESET MEANS

Adolph K. Rapp and Philip Spiegel, Philadelphia, Pa., assignors, by mesne assignments, to Philco Corporation, Philadelphia, Pa., a corporation of Delaware Filed Nov. 25, 1959, Ser. No. 855,295
8 Claims. (Cl. 307—88.5)

This invention relates to pulse counters and more particularly to a novel pulse counter employing series-connected tunnel or Esaki diodes.

The tunnel diode, though a relatively new device, is sufficiently known so that it requires no description for the present purpose. It is described in the January 15, 1958, issue of Physical Review commencing at page 603, to which reference may be had if desired.

It has been determined that a plurality of series-connected tunnel diodes have a voltage-current characteristic consisting of a number of undulations corresponding to the number of diodes, and this invention is based on the discovery that if current is passed through said diodes such that the current level intersects all of the negative resistance portions of said undulations, the voltage across the series-connected diodes can be caused to change from an initial value progressively in a number of discrete steps corresponding to the number of said diodes by applying successive input voltage pulses across the diodes.

Based on this discovery, the principal object of this invention is to provide a pulse counter which is simple and inexpensive and requires little power, and yet is highly efficient in operation.

In accordance with this invention, a pulse counter is provided comprising a plurality of tunnel diodes connected in series which have a voltage-current characteristic consisting of a number of undulations corresponding to the number of diodes, means for passing current through said diodes such that the current level intercepts all of the negative resistance portions of said undulations, input means to enable application of successive input voltage pulses across the series-connected diodes, whereby the voltage across said diodes is caused to change from an initial value progressively in a number of discrete steps corresponding to the number of said diodes, reset means connected to said diodes and responsive to the final voltage change thereacross for restoring said initial value of the voltage, and means for deriving from said reset means an output pulse indicative of the fact that a number of input pulses have been counted corresponding to the number of said diodes.

The invention may be fully understood from the following detailed description with reference to the accompanying drawing, wherein FIG. 1 illustrates the voltage-current characteristic of a number of series-connected tunnel diodes;

Figures 1, 2, 5:
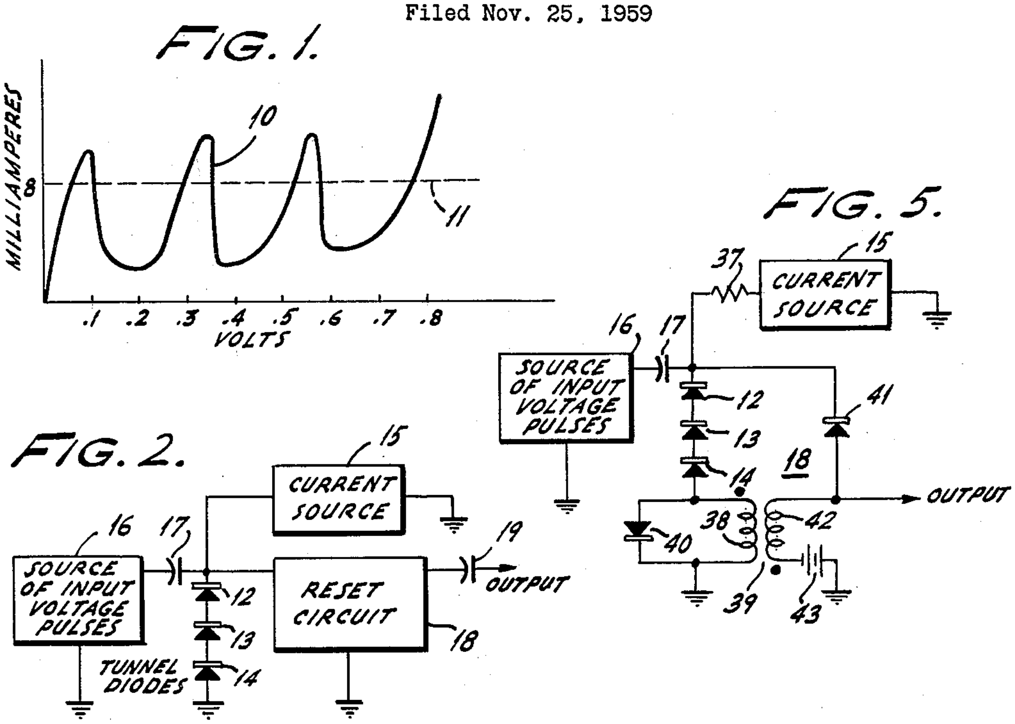
FIG. 2 is a diagrammatic illustration of a pulse counter according to this invention.
FIG. 5 is a diagrammatic illustration of the pulse counter employing another form of the reset circuit.

Referring more particularly to the drawing, FIG. 1 shows the voltage-current characteristic 10 of three series-connected tunnel diodes, from which it will be seen that the characteristic consists of a number of undulations corresponding to the number of diodes. The illustrated characteristic was derived by applying increasing voltage across three series-connected tunnel diodes. It is typical of the voltage-current characteristic of series-connected tunnel diodes. Thus if an increasing voltage of proper polarity is applied across series-connected tunnel diodes, the current will successively increase and decrease as illustrated.

As previously stated, this invention is based on the discovery that if current is passed through the series-connected tunnel diodes such that the current level, represented in FIG. 1 by the broken line 11, intersects all of the negative resistance portions of said undulations, the voltage across the diodes can be caused to change from an initial value progressively in a number of discrete steps corresponding to the number of diodes by applying successive input voltage pulses across the diodes. Thus with $n$ tunnel diodes connected in series, $n$ being any integer, the voltage across the diodes will change in $n$ discrete steps in response to successive input pulses.

Referring now to FIG. 2, by way of example there are shown three series-connected tunnel diodes 12, 13 and 14. Current of the aforementioned magnitude is passed through the diodes from a constant current source 15 which may, for example, comprise a battery in series with a resistor whose resistance is much greater than the total resistance of the series-connected diodes. Input pulses from a source 16 are applied across the diodes through coupling capacitor 17 to cause the voltage across the diodes to change as above stated. A reset circuit 18 is connected to the diodes and is responsive to the final voltage change to restore the initial value of the voltage across the diodes. At the same time an output pulse is derived from the reset circuit through capacitor 19, which pulse indicates that a number of input pulses have been counted corresponding to the number of diodes.

Figure 3:
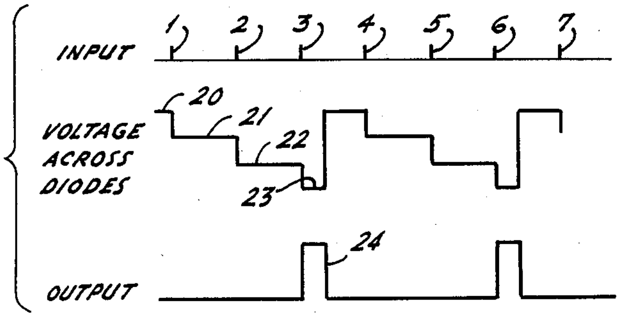
FIG. 3 illustrates the operation of the pulse counter.

The operation is illustrated in FIG. 3. The input voltage pulses are represented at 1, 2, 3 etc., there being 7 pulses shown. The voltage across the diodes initially is at a level 20, and in response to the successive input voltage pulses 1, 2, and 3, the voltage across the diodes changes in discrete steps to levels 21, 22 and 23. Then the reset circuit restores the voltage to its initial level and at the same time an output pulse 24 is derived from the reset circuit. The counter then repeats its operation in response to the succeeding input pulses.

Figure 4:
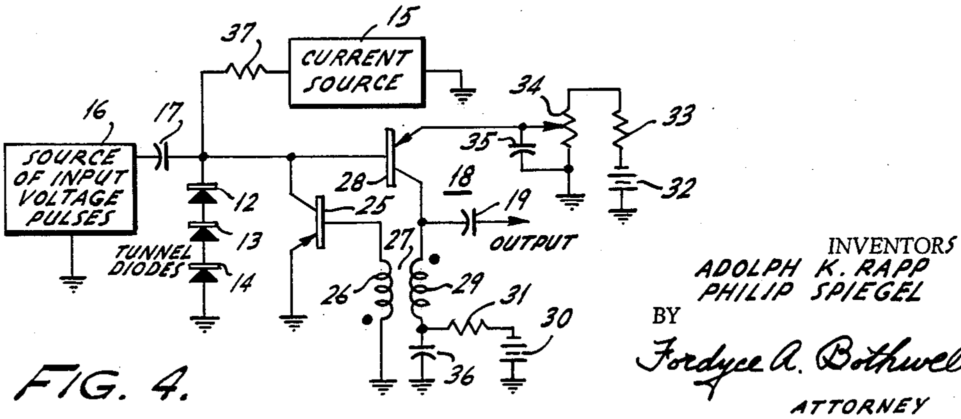
FIG. 4 is a diagrammatic illustration of the pulse counter employing one form of the reset circuit.

Referring now to FIG. 4, the pulse counter is there illustrated with one form of the reset counter circuit 18. A transistor 25 has its emitter-collector circuit in shunt with the series-connected tunnel diodes 12, 13 and 14, and has its base connected to a winding 26 of a phase-inverting transformer 27. A second transistor 28 has its base connected to the upper terminal of the series-connected diodes, and has its collector connected to winding 29 of the phase-inverting transformer 27. The collector of transistor 28 is reverse biased by source 30 through resistor 31 and the emitter of said transistor is reverse biased by source 32 through resistor 33 and potentiometer 34. The reverse bias of the emitter is such that transistor 28 will not conduct until the voltage across the diodes changes in a number of discrete steps corresponding to the number of diodes. Then transistor 28 conducts and the voltage at its collector goes in the positive direction, initiating an output pulse. At the same time, the phase inverting transformer 27 drives the base of transistor 25 negative. This causes transistor 25 to go into saturation and short circuits the diodes, which in turn cuts off transistor 28 and terminates the output pulse. The pulse counter is then ready for the next operation.

By way of example, in a physical embodiment according to FIG. 4 the values of the circuit components are as follows:

| | | |
|---|---|---|
| Capacitor **37** | micromicrofarads | 1000 |
| Capacitor **19** | do | 1000 |
| Source **30** | volts | 6 |
| Resistor **31** | ohms | 220 |
| Source **32** | volts | 1.5 |

| | | |
|---|---|---|
| Resistor **33** | ohms | 220 |
| Potentiometer **34** | do | 250 |
| Capacitor **35** | microfarad | .01 |
| Capacitor **36** | do | .01 |
| Resistor **37** | kilohms | 4.7 |

In such embodiment a constant current of about 8 milliamperes is employed.

Referring now to FIG. 5, the pulse counter is shown with still another form of the reset circuit 18 employing two fast acting diodes instead of transistors. In series with the tunnel diodes is a winding 38 of a phase-inverting transformer 39, and in shunt with said winding is a diode 40 which is poled oppositely from the tunnel diodes. A second diode 41 is connected across the tunnel diodes in series with winding 42 of the phase-shifting transformer 39. By way of example, each of the diodes 40 and 41 may be a Transitron S-570G or a Qutronic Q–6100. Diode 41 is reverse biased by biasing source 43, so that it will not conduct until the voltage across the tunnel diodes has changed to level 23 in FIG. 3.

In operation, when the voltage across the tunnel diodes changes to said level, diode 41 conducts and diverts some of the current from the constant current source through a parallel path around the tunnel diodes. This diverted current flows through winding 42 of the phase-inverting transformer 39 and produces an output pulse and also produces across winding 38 a voltage which opposes conduction by the tunnel diodes and thus further decreases the current there-through and causes more of the current to be diverted through diode 41 effectively short-circuiting the tunnel diodes. The result is that the voltage across the tunnel diodes is restored to its initial value and the counter is ready for repeat operation. Since at this time the reversal of polarity of the voltage across winding 38 would tend to cause undesired current flow in the tunnel diodes, the diode 40 is provided to prevent this by effectively short-circuiting said winding.

In experimental use of the present invention, as many as ten tunnel diodes have been used, thus providing a decade counter.

Since tunnel diodes are inexpensive this invention provides a pulse counter which is low in cost and yet is capable of counting pulses at very rapid rates. Experimental use has shown that a pulse counter according to this invention is capable of counting as many as $70\times10^6$ pulses per second.

While certain embodiments of the invention have been illustrated and described, it will be understood that the invention is not limited thereto but contemplates such modifications and further embodiments as may occur to those skilled in the art.

We claim:

1. A pulse counter comprising a plurality of tunnel diodes connected in series which have a voltage-current characteristic consisting of a number of undulations corresponding to the number of diodes, means for passing current through said diodes such that the current level intersects all of the negative resistance portions of said undulations, input means to enable application of successive input voltage pulses across the series-connected diodes, whereby the voltage across said diodes is caused to change from an initial value progressively in a number of discrete steps corresponding to the number of diodes, reset means connected across said diodes and responsive to the final voltage change thereacross for restoring said initial value of the voltage, and means for deriving from said reset means an output pulse indicative of the fact that a number of input pulses have been counted corresponding to the number of said diodes.

2. A pulse counter comprising a plurality of tunnel diodes connected in series which have a voltage-current characteristic consisting of a number of undulations corresponding to the number of diodes, means for passing current through said diodes such that the current level intersects all of the negative resistance portions of said undulations, input means to enable application of successive input voltage pulses across the series-connected diodes, whereby the voltage across said diodes is caused to change from an initial value progressively in a number of discrete steps corresponding to the number of diodes, reset means connected across said diodes and responsive to the final voltage change thereacross for momentarily short-circuiting said diodes to restore said initial value of the voltage and for producing a voltage pulse, and output means for deriving the latter pulse which is indicative of the fact that a number of input pulses have been counted corresponding to the number of said diodes.

3. A pulse counter comprising a plurality of tunnel diodes connected in series which have a voltage-current characteristic consisting of a number of undulations corresponding to the number of diodes, means for passing current through said diodes such that the current level intersects all of the negative resistance portions of said undulations, input means to enable application of successive input voltage pulses across the series-connected diodes, whereby the voltage across said diodes is caused to change from an initial value progressively in a number of discrete steps corresponding to the number of diodes, a normally non-conductive transistor having its emitter and collector connected directly across said diodes, means responsive to the final voltage change across said diodes for driving said transistor into saturation to restore said initial value of the voltage and for producing a voltage pulse, and output means for deriving the latter pulse which is indicative of the fact that a number of input pulses have been counted corresponding to the number of said diodes.

4. A pulse counter comprising a plurality of tunnel diodes connected in series which have a voltage-current characteristic consisting of a number of undulations corresponding to the number of diodes, means for passing current through said diodes such that the current level intersects all of the negative resistance portions of said undulations, input means to enable application of successive input voltage pulses across the series-connected diodes, whereby the voltage across said diodes is caused to change from an initial value progressively in a number of discrete steps corresponding to the number of diodes, a first normally non-conductive transistor having its emitter and collector connected directly across said diodes, a second transistor connected to said diodes to be rendered conductive by the voltage across the diodes, means for rendering said second transistor non-conductive until occurrence of the final voltage change across said diodes, means responsive to conduction of said second transistor for driving said first transistor into saturation to restore said initial value of the voltage across said diodes and for producing a voltage pulse, and output means for deriving the latter pulse which is indicative of the fact that a number of input pulses have been counted corresponding to the number of said diodes.

5. A pulse counter according to claim 4, wherein the penultimate means comprises a phase-shifting transformer having a winding connected in the collector circuit of said second transistor and having another winding connected in the base circuit of said first transistor.

6. A pulse counter comprising a plurality of tunnel diodes connected in series which have a voltage-current characteristic consisting of a number of undulations corresponding to the number of diodes, means for passing current through said diodes such that the current level intersects all of the negative resistance portions of said undulations, input means to enable application of successive input voltage pulses across the series-connected diodes, whereby the voltage across said diodes is caused to change from an initial value progressively in a number of discrete steps corresponding to the number of diodes, a normally non-conductive diode connected in shunt relation to said tunnel diodes and adapted to be rendered conductive in response to the final voltage change across said tunnel diodes, and means for producing an output pulse and for restoring the initial value of the voltage across said tunnel diodes when the last-recited diode is rendered conductive.

7. A pulse counter according to claim 6, wherein the last-recited means comprises a phase-reversing transformer having a winding in series with said tunnel diodes and another winding in series with the last-recited diode.

8. A pulse counter according to claim 7, further comprising a diode connected across the first-mentioned winding so as to prevent reversal of polarity of the voltage across said winding from producing undesired current flow in the tunnel diodes.

References Cited in the file of this patent

UNITED STATES PATENTS

| | | |
|---|---|---|
| 2,275,460 | Page | Mar. 10, 1942 |
| 2,837,652 | Nailen | June 3, 1958 |
| 2,903,604 | Henle | Sept. 8, 1959 |